(12) United States Patent
Enderwick et al.

(10) Patent No.: US 7,434,045 B1
(45) Date of Patent: Oct. 7, 2008

(54) METHOD AND APPARATUS FOR INDEXING AN INBOUND SECURITY ASSOCIATION DATABASE

(75) Inventors: Thomas Enderwick, San Jose, CA (US); Ashwath Nagaraj, Los Altos, CA (US); Ramakrishna Rao, San Jose, CA (US); Benjamin Tseng, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 663 days.

(21) Appl. No.: 10/420,568

(22) Filed: Apr. 21, 2003

(51) Int. Cl.
*H04L 9/00* (2006.01)
(52) U.S. Cl. .......................... 713/158; 726/2
(58) Field of Classification Search ................ 713/153, 713/158; 726/2
See application file for complete search history.

(56) References Cited

U.S. PATENT DOCUMENTS

| | | | | |
|---|---|---|---|---|
| 2001/0023482 | A1* | 9/2001 | Wray | 713/151 |
| 2002/0188839 | A1* | 12/2002 | Noehring et al. | 713/153 |
| 2002/0188871 | A1* | 12/2002 | Noehring et al. | 713/201 |
| 2003/0185391 | A1* | 10/2003 | Qi et al. | 380/44 |

OTHER PUBLICATIONS

Kent, S. Atkinson, R. RFC 2401. Networking Group. Security Architecture for the Internet Protocol. http://www.ietf.org/rfc/rfc2401.txt. Accessed on Sep. 6. 2007, p. 46.*
R. Thayer, et al., "IP Security, Document Roadmap," Nov. 1998, Network Working Group, Request for Comments: 2411, http://www.ietf.org/rfc/rfc2411.txt?number=2411, printed Jul. 25, 2003, pp. 1-11.
S. Kent, et al., "Security Architecture for the Internet Protocol," Network Working Group, Request for Comments: 2401, pp. 1-59.

* cited by examiner

*Primary Examiner*—Kambiz Zand
*Assistant Examiner*—Jason K Gee
(74) *Attorney, Agent, or Firm*—Hickman Palermo Truong & Becker LLP

(57) ABSTRACT

Processes are disclosed in which an index value is generated for locating a security association in a security association database, such as an inbound SAD associated with the IPsec set of protocols. The index value is specified for insertion into a Security Parameter Index (SPI) field of a packet header, such as an IPsec header. For packets that are to be secured according to the policies and protocols identified in the header and the security association and that are transmitted to a particular network device or host, the index value is inserted into the SPI field of the packets by a packet sender. The packet is then parsed by a packet receiver, the index value determined from the SPI and used to identify the security association in the SAD, based solely on the index value determined from the SPI. Hence, a simple and efficient mechanism is provided for fast inbound security association lookups.

18 Claims, 7 Drawing Sheets

METHOD AND APPARATUS FOR INDEXING AN INBOUND SECURITY ASSOCIATION DATABASE

FIELD OF THE INVENTION

The present invention generally relates to communication networks. The invention relates more specifically to a method and apparatus for indexing an inbound IPsec Security Association Database (SAD).

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

IPsec Protocol

The Security Architecture for the Internet Protocol and related protocols such as IKE and ISAKMP provide a standards-based method of providing privacy, integrity, and authenticity to information transferred point-to-point between peers across IP networks, such as the public Internet and private local networks. IPsec provides IP network-layer encryption. That is, it provides security at the packet-processing layer of network communication.

IPsec defines formats of packet headers to be added to IP packets, including the authentication header (AH) to provide data integrity and the encapsulating security payload (ESP) to provide confidentiality and data integrity. Furthermore, key management and security associations may be negotiated with the Internet Key Exchange (IKE). A security association (SA) is a set of IPsec parameters that have been negotiated between two devices, or installed after an out-of-band agreement of some sort, e.g., manual keying without IKE. Because the encrypted packets appear to be ordinary packets, they can easily be routed through any IP network without changes to the intermediate network equipment.

Several papers on various aspects of IPsec are available at the time of this writing, and can be located via the document "ipsec.html" in directory "ids.by.wg" of domain "ietf.org". In addition, numerous RFCs (Request For Comment) are available from the Network Working Group of the IETF (Internet Engineering Task Force), and can be located via the document "rfc.html" of domain "ietf.org", such as RFC 2411, entitled "IP Security Document Roadmap," and RFC 2401 by S. Kent and R. Atkinson, entitled "Security Architecture for the Internet Protocol," which is incorporated by reference herein for all purposes.

IPsec provides two modes of operation: transport mode and tunnel mode. In transport mode, only the IP payload is encrypted, with the original IP headers left intact. This mode adds minimal bytes to each packet. In tunnel mode, the entire original IP packet is encrypted and it becomes the payload in a new IP packet. This allows a network device, such as a router or gateway, to act as an IPsec proxy and perform encryption on behalf of the hosts. The source router or gateway encrypts packets and forwards them along the IPsec tunnel, and the destination router or gateway decrypts the original packet and forwards it to the destination host.

The concept of a security association (SA) is fundamental to IPsec. Both AH and ESP protocols use security associations, and a major function of IKE is the establishment and maintenance of security associations. A security association is defined in RFC 2401 as a simplex "connection" that affords security services to the traffic carried by the connection. Further, security services are afforded to an SA through the use of AH or ESP, but not both. That is, if both AH and ESP protection is applied to a traffic stream, an SA is created for each protocol. To secure typical, bi-directional communication between two nodes, two SAs are required on each peer, one in each direction. Security associations are uniquely identified by a combination of a Security Parameter Index (SPI), a Destination IP Address, and a security protocol (such as AH or ESP) identifier. The SPI is carried in AH and ESP protocol headers to enable the receiving system to select the SA under which a received packet is processed, when considered in conjunction with the destination IP address and protocol fields of the IP header. The value of the SPI is chosen by the peer who will be receiving packets on that SA.

A Security Association Database (SAD) stores records of parameters that are associated with each active SA. Each interface for which IPsec is enabled, for example, a logical or physical port of a network router, requires separate inbound (SAD) and outbound (Security Policy Database, or SPD) databases. Each IPsec peer maintains a resident SAD. Each entry in a SAD defines the parameters associated with one SA, and each SA must have an entry in the SAD.

In prior approaches, each entry in an inbound Security Association Database has been indexed by a function of the following three parameters: (1) an outer header's destination IP address, a 32-bit or 128-bit value which is typically the IPv4 or IPv6, respectively, destination address; (2) an IPsec protocol identifier, AH or ESP, a 8-bit value which specifies the security protocol to be applied to traffic on, or associated with, a given security association; and (3) an entire Security Parameter Index (SPI), a 32-bit value used to distinguish among different security associations terminating at the same destination and using the same protocol. Hence, in the conventional approach, an index value derived from three values totaling 72 bits for IPv4, or 168 bits for IPv6, has been used to identify, locate and access any given SA in an inbound SAD.

Security Association Databases have become larger and larger due to the number of inbound sessions that current networking equipment can service. Because of the length of the conventional index value, conventional implementations typically require some type of search mechanism for fast access to the SAs represented in a SAD. For example, content addressable memory (CAM) can be used to provide adequate and necessary SA look-up capability, which results in more complex and more costly equipment.

Based on the foregoing, there is a clear need for an improved mechanism for identifying and accessing security associations represented in a inbound Security Association Database.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for indexing an inbound IPsec Security Association Database is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Processes are disclosed in which an index value is generated for locating a security association in an inbound security association database, such as an inbound SAD associated with the IPsec set of protocols. The index value is specified for insertion into a Security Parameter Index (SPI) field of a packet header, such as an IPsec header. For packets that are to be secured according to the policies and protocols identified in the header and the security association and that are transmitted to a particular network device or host, the index value is encoded into a portion of the SPI field of the packets by a packet sender. The packet is then parsed by a packet receiver, the index value determined from the SPI and used to identify the inbound security association in the SAD, based on the index value determined from the SPI. Hence, a simple and efficient mechanism is provided for fast inbound security association lookups using a relatively short direct index key.

In certain embodiments, a second portion of the SPI field carries a verification value. The same verification value is stored in the SAD entry of the associated SA. A process can verify that the index value identified the correct SA entry by comparing the verification values.

Operating Environment Example

Figure 1:
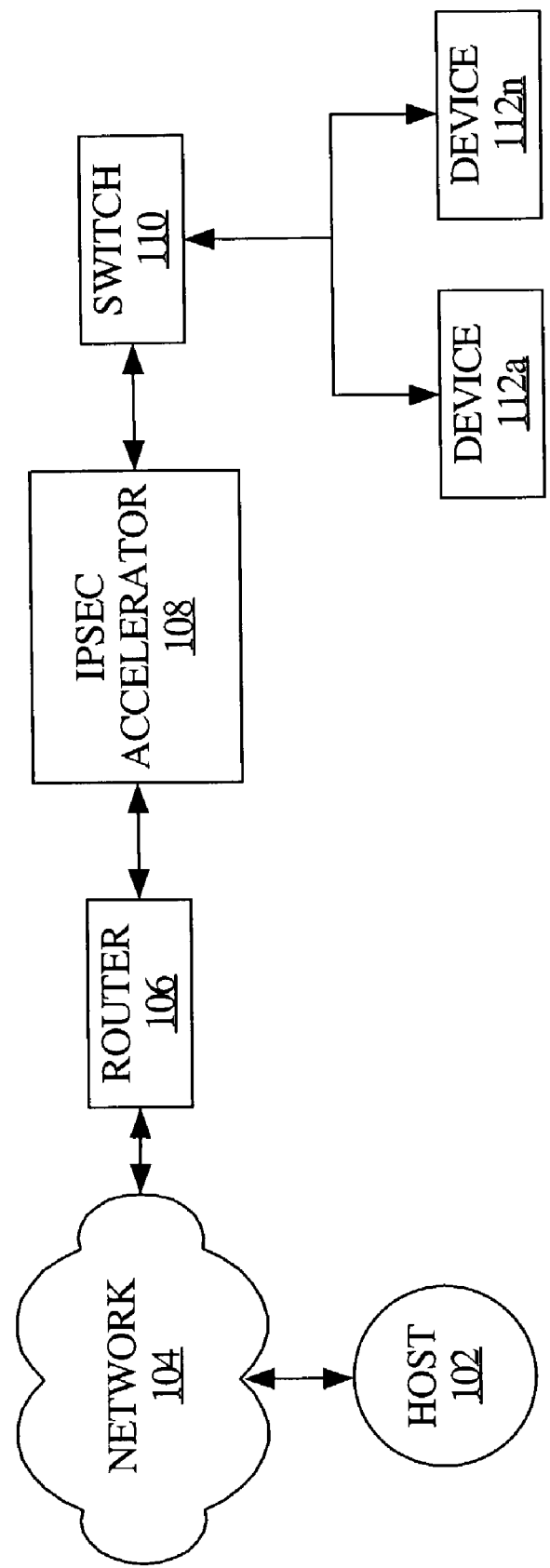
FIG. 1 is a block diagram of an example operating environment in which an embodiment may be implemented.

FIG. 1 is a block diagram of an example operating environment in which an embodiment may be implemented.

A host 102 is communicatively coupled to a packet-switched network 104. Host 102 broadly represents any source of data packets which support the IPsec protocols. For example, host 102 is a network end station, router or switch.

Network 104 may contain any number of network infrastructure elements including routers, switches, gateways, etc. Such elements are omitted from FIG. 1 for clarity, because they are not pertinent to the embodiments described herein. In one embodiment, network 104 is a TCP/IP network in which infrastructure elements execute a conventional routing protocol, such as RIP, EIGRP, OSPF, BGP, etc., for routing packets among the infrastructure elements.

Router 106 is also communicatively coupled to network 104. Router 106 may route data packets to a local area network, or to other network infrastructure elements. As an example, router 106 receives and routes from and to a LAN having any number of end devices 112a through 112n.

An IPsec accelerator ("accelerator") 108 is configured somewhere between the network 104 and end devices 112a, 112n. Although depicted in FIG. 1 as separate from router 106, accelerator 108 may reside in router 106 and interface with an IPsec peer such as host 102, or another network component that supports the transmission, reception, passing, switching, and the like, of secure data packets using IPsec. In many scenarios, accelerator 108 is configured in some form as an interface with a private network or LAN at which secure data packets or secure "tunnels" terminate. Furthermore, accelerator 108 may also be configured within a LAN infrastructure. Generally, accelerator 108 enables, and enhances relative to prior approaches, implementation of the IPsec protocol in a network component, as described herein.

IPsec accelerator 108 is also communicatively connected to a switch 110. Switch 110 depicts a conventional network switching device, which operates to direct network traffic in the form of data packets to various end devices 112a, 112n.

For purposes of illustrating a clear example, limited numbers of network elements are shown in FIG. 1. However, in a practical embodiment, there may be any number of such elements within network 104 or between the elements depicted in FIG. 1.

IPsec Accelerator

Figure 2:
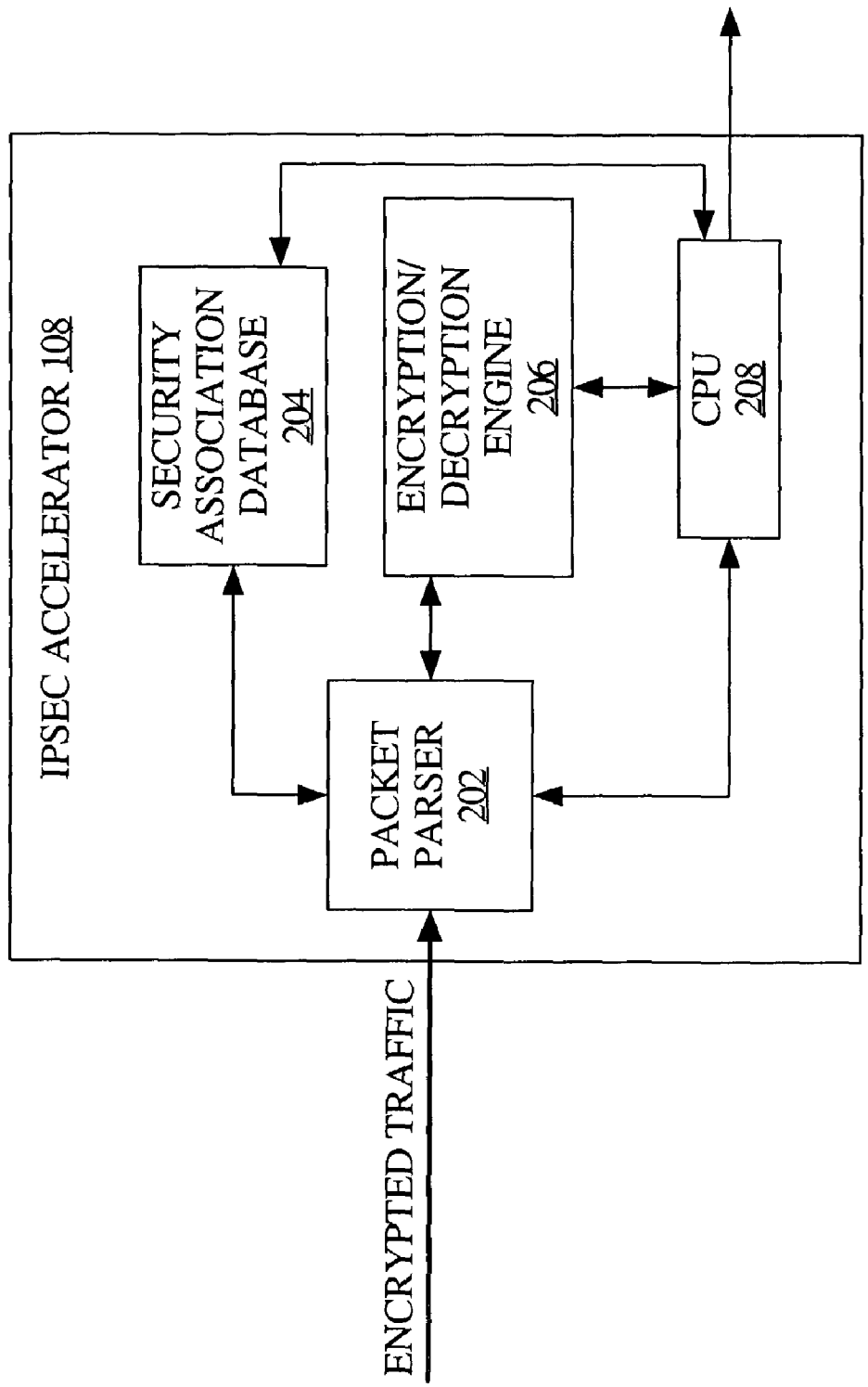
FIG. 2 is a simplified block diagram that illustrates components of an IPsec accelerator.

FIG. 2 is a simplified block diagram that illustrates components of an IPsec accelerator 108. For clarity, only inbound packet processing components are depicted in FIG. 2, however, implementations of accelerator 108 preferably also comprise outbound packet processing components. Alternatively, accelerator 108 may be configured with components that process both inbound and outbound packets.

Accelerator 108 comprises an inbound packet parser ("parser") 202, a security association database ("SAD") 204, and encryption/decryption engine ("engine") 206 and a CPU 208. The configuration of accelerator 108 is not limited to the components depicted in FIG. 2, for other conventional components may also be implemented in accelerator 108, such as a memory controller, RAM, and the like, a crypto processor, and an implementation of a IPsec Security Policy Database (SPD).

Parser 202 operates to parse and classify incoming packets. Parser 202 then passes the packet to the encryption/decryption engine 206 or to the CPU 208, depending on information contained within the packet or packet header. Parser 202 may perform additional functions, such as checking the IP protocol version and Ethernet type associated with the packet. In one embodiment, parser 202 is implemented in an FPGA (Field-Programmable Gate Array).

SAD 204 is a security association database configured for storing parameters associated with security associations between network devices operating as IPsec peers, such as host 102 and any or all of devices 112a, 112n (FIG. 1). For example, one SA pair could be used to protect all traffic between host 102 and the LAN containing 112a, 112n. According to one aspect, SAD 204 is an IPsec Security Association Database for storing IPsec security associations, such as transport mode and tunnel mode security associations. Furthermore, encryption and authentication keys are also typically stored in the database records. A security association (SA) is a management construct used to enforce a security policy in the IPsec environment and is represented as a record in the SAD. A set of security services offered by a security policy associated with an SA depends on the security protocol selected (e.g., AH or ESP), the SA mode, the endpoints of the SA, and on optional services within the IPsec protocol. For example, a security policy may specify that traffic is protected by ESP in transport mode using 3DES-CBC encryption, nested inside of AH in tunnel mode using HMAC/SHA-1 encryption. In one embodiment, SAD 204 is implemented in RAM of accelerator 108.

Encryption/decryption engine 206 is logically coupled to, for example, a crypto processor, a FIFO interface to parser 202 and inbound and outbound packet processing components. Engine 206 operates to decrypt inbound packets and encrypt outbound packets, preferably in conjunction with a crypto processor. After decrypting an inbound packet, engine 206 passes the packet to CPU 208. In one embodiment, engine 206 is implemented in a combination of an ASIC and an FPGA.

CPU 208 depicts a conventional processor for processing inbound packet traffic. CPU 208 may be implemented further to process outbound packet traffic. CPU 208 functionality is described in more detail below in reference to inbound packet processing flow. Preferably, the components of accelerator 108 and the inbound packets are such that the processing required of CPU 208 is minimized, thereby providing a fast packet flow. For example, packets that may require more processing from the CPU 208 include (1) outbound packets that do not have a matching SA entry, thus requiring a key exchange, (2) outbound packets that need fragmentation or inbound packets that need reassembly, and (3) packets that need encryption or decryption using an algorithm that is not supported by the local crypto processor. Typically, CPU 208 outputs packets to a MAC (Media Access Control) device for MAC layer (a sub-layer of the data link control layer of the OSI model of communication) level processing.

Process for Locating an Inbound Security Association

Figure 3A:
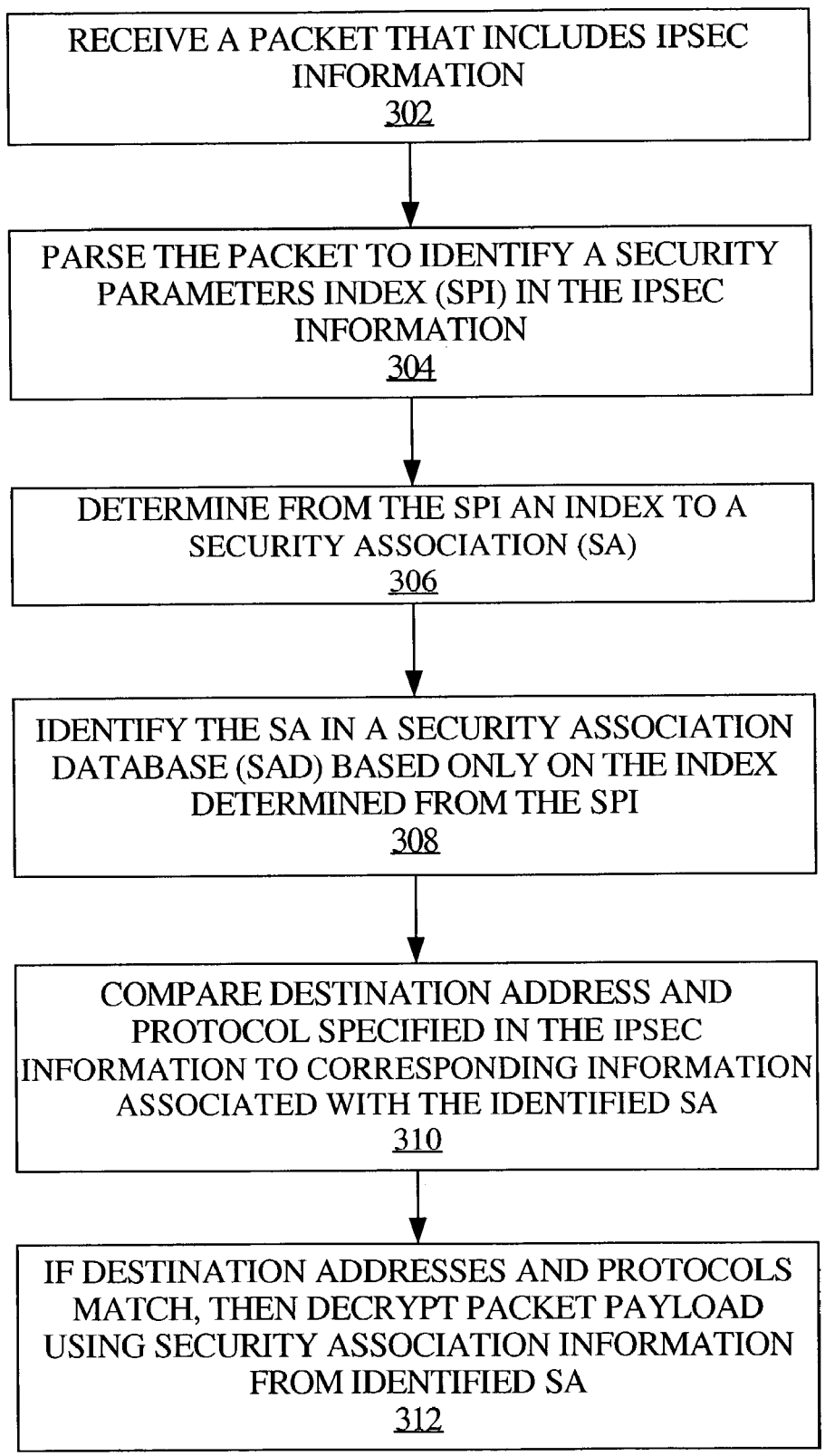
FIG. 3A is a flow diagram that illustrates a process for locating a security association.

FIG. 3A is a flow diagram that illustrates a process for locating a security association. The process is illustrated in the context of IPsec security associations, but other implementations may use other suitable known or unknown emerging network communication security protocols.

At block 302, a packet is received that includes IPsec information. For example, a packet is received that includes an IPsec header that identifies an IPsec protocol and a Security Parameters Index (SPI), as well as an outer header (e.g., IP) that includes a destination IP address.

At block 304, the packet is parsed to identify a SPI in the IPsec information. Conventional packet parsing techniques may be used at block 304.

At block 306, an index to a specific security association is determined from the SPI identified at block 304. For example, a direct indexing scheme may be used to identify and index, in the SPI, SAs stored in an SAD associated with a given endpoint. In other words, the SAD index is a function of the SPI. In one embodiment, a bitmap index is used to identify the SA in the SAD. Further, according to one embodiment, using an SAD having up to $2^{17}$ entries, a 17-bit value is used in the SPI to directly identify an SA in the SAD. The SA corresponds to packet payload associated with the IPsec information, that is, it corresponds to data transmitted between network nodes or devices according to specified security policies, protocols, and the like, which were negotiated by the devices at the time of creation of the associated SA.

Figure 3B:
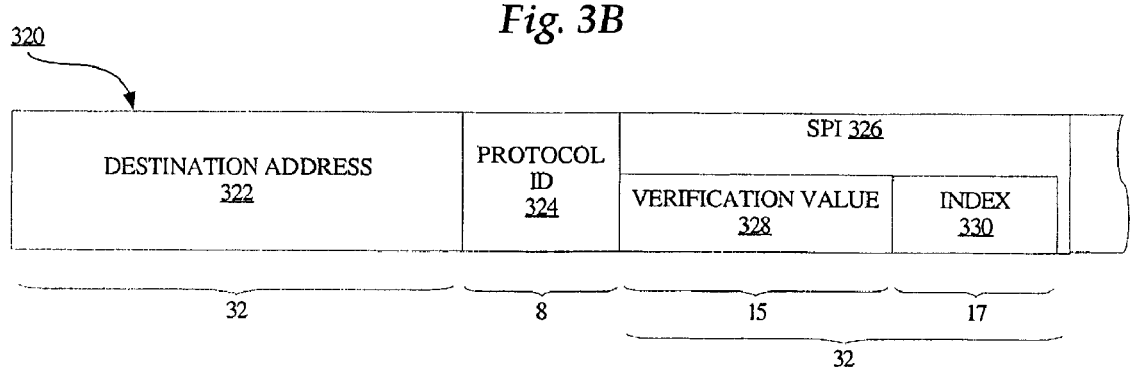
FIG. 3B is diagram that illustrates contents of a security packet header.

FIG. 3B is diagram that illustrates contents of a security packet header 320. Security packet header 320 comprises the following data fields with associated size constraints: (1) a destination address 322 field; 32-bit for IPv4, 128 bit for IPv6; (2) an 8-bit protocol identifier 324 field; and (3) a 32-bit SPI 326 field. Furthermore, in an embodiment, the SPI 326 field comprises an index 330. Index 330 is used as an index into an SAD, to identify and locate specific SAs stored in the SAD.

In a specific implementation, index 330 utilizes 17 bits of the 32-bit SPI 326 field. In another embodiment, the SPI 326 field further comprises a verification value 328. In the specific implementation, the field for storing the verification value 328 has a size constrained to the remaining 15 bits of the 32-bit SPI field.

Figure 3C:
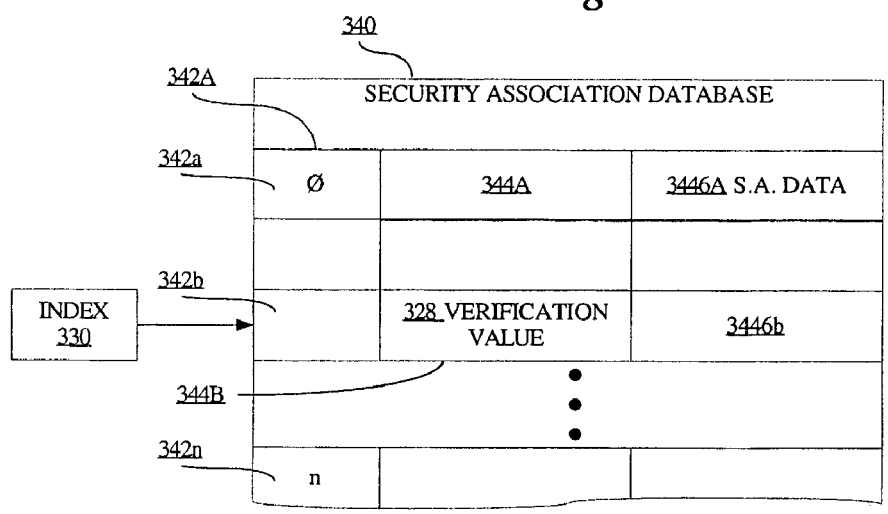
FIG. 3C is a diagram that illustrates the contents of a Security Association Database.

FIG. 3C is a diagram that illustrates the contents of a Security Association Database (SAD) 340. SAD 340 is depicted as a data table with columns and rows, where a row is one record in the database. However, other logical data constructs may be used.

SAD 340 comprises, in one embodiment, a column 342A for storing multiple index values 342a, 342b, 342n used to index records in SAD 340. Each index value 342a, 342b, 342n identifies a record, or row, in the SAD 340. Each record in SAD 340 comprises, in addition to the identifying index value, a verification value column 344A and security association data column 346A.

Security packet header 320 (FIG. 3A) is used to locate records in SAD 340. For example, index 330 of SPI 326 of security packet header 320 is a direct index to a security association record identified by the value of index 330, as shown in FIG. 3B. Index 330 provides the location of the appropriate SA, in SAD 340, that is specified in packet header 320 for packet payload associated with packet header 320.

Returning to FIG. 3A, at block 308, the security association is identified in the SAD based only on the index determined from the SPI at block 306. In one embodiment, a 17-bit value from a portion of the SPI is used to index into the SAD to locate the associated SA, which is identified in the SAD by the same 17-bit value. 17 bits is the minimum number of bits needed to represent a number capable of directly indexing 128k SAs. Alternatively to direct indexing, other indexing schemes may be implemented, such as use of conventional hash functions.

Hence, a simpler and more efficient indexing process is provided for locating and accessing parameters associated with inbound security associations that are stored in databases. In IPsec embodiments, an index is effectively embedded in to a portion of the SPI, eliminating the need for a function to compute the index from multiple values. There is no longer a need for a CAM (content-addressable memory) or other mechanisms and the associated processing for locating an SA in an SAD. Furthermore, only 17 bits of data are needed to locate an SA in an SAD having $2^{17}$ entries, whereas 72 (32 bits for the destination IP address; 8 bits for the protocol; 32 bits for the SPI index) bits are used as a search key in prior approaches. Therefore, both hardware and logical processing resources are reduced in relation to prior approaches. Consequently, physical and computational costs are reduced in relation to prior approaches.

In one embodiment, an optional block 310 is further performed. At block 310, the destination address and the protocol specified in the IPsec information are compared to a destination address and protocol associated with the SA identified at block 308.

In reference to FIG. 3C, once the record for an SA is located in SAD 340, according to one embodiment, the associated verification value is read from the verification value field of column 344A. The verification value read from column 344A is compared to an associated verification value from the SPI 326 of the associated security packet header 320 to verify that the appropriate record has been identified in SAD 340, based on the security packet header 320. For example, once the record of SAD 340 that is identified by index 330 is located, verification value 328 is read from column 344A of SAD 340, and compared with the verification value 328 of security packet header 320. If the verification values match, the SA record initially identified via index 330 is verified to be the appropriate record. Therefore, the SA data 346b associated with index 330 is read from column 346A, and further processing of the packet is performed according to the SA 346b.

For example, if both the destination address and the protocol match between the IPsec information and the identified security association, then the inbound packet payload is processed (e.g., authenticated and decrypted) based on security association information from the identified SA, at optional block 312. For example, an encryption/decryption algorithm for encoding/decoding packets is specified in an SA. Hence, in that embodiment, the destination IP address and protocol are used to verify the SA identified at block 308; however, they are not used to identify the SA in the SAD.

If the verification values do not match, then the destination address 320 is checked to further determine how to process the packet, such as at block 310 of FIG. 3A. If the destination address 320 is not an IP address of the device, then this may be a transit IPsec packet. In such a scenario, the governing policy may allow the IPsec traffic to flow thru the device. If the destination address 320 is an IP address of the device, then the packet is discarded.

Generally, the appropriate SA is accessed from the SAD 204 and the SA information used to perform IPsec processing for every IPsec header until a transport protocol header or an IP header that is not for the local system is encountered. For multiple encapsulated IPsec scenarios, the entire flow 302 thru 312 is processed for each layer of encapsulation. Further, each SA typically has a valid indicator that may also be checked.

In addition, an incoming policy that matches the decrypted packet is found in a Security Policy Database (SPD). This action can be performed, for example, by using backpointers from the SAs to the SPD or by matching the packet's selectors against those of the policy entries in the SPD. It is then verified whether the SAs found in the SAD 204 match the kind of SAs required by the policy previously found in the SPD.

Inbound Packet Flow Through Accelerator

With reference to accelerator 108 of FIG. 2, an example flow of a data packet through accelerator 108 is generally described. In some scenarios, packet processing is divided between packet parser 202 and CPU 208. The following description describes a relevant portion of the packet processing; however, additional processing may be performed by the respective components of accelerator 108.

Parser 202

Upon reception of a data packet from network 104 (FIG. 1), parser 202 parses the packet, checks the Ethernet type and IP protocol version. If IPsec information, such as an IPsec header, is identified, parser 202 attempts to fetch a security association (SA) from security association database 204. If parser 202 finds the SA for the packet in SAD 204, the SA is verified and the packet is not fragmented, then it passes the packet to encryption/decryption engine 206. Otherwise, parser 202 passes the packet to CPU 208 for further processing. Examples of scenarios in which the packet is passed to CPU 208 include: (1) if the destination address is either a broadcast or multicast address; (2) if the packet is a "clear" packet, that is, a packet with protocol not equal to AH or ESP; (3) if the packet is fragmented; (4) if the packet is an IPsec packet and a matching SA is not found in SAD 204; (5) if the packet is an IPsec packet and the matching SA indicates that encryption/authentication algorithm is not supported by the local crypto processor; and (6) the packet is transit IPsec traffic.

The parser 202 extracts the Security Parameter Index (SPI) value, which, according to embodiments, contains an index to associated SA parameters in SAD 204 and extracts the protocol and destination address from the packet. If no SA is found in the SAD 204 based on the index value extracted from the SPI, then the packet is passed to CPU 208. If a valid SA is found, the Proceed/Pass flag in the SA is checked. If the Pass flag is set, the packet is passed to CPU 208. The CPU 208 sets this flag if an associated encryption/decryption circuit does not support the algorithm specified in the SA. If the Proceed flag is set and the protocol and destination address of the packet do not match those in the SA, then the packet is passed to the CPU. If a valid SA is located in and accessed from SAD 204 and verified with the related protocol and destination address, then the packet is passed to the engine 206 for decryption and subsequent processing by CPU 208.

CPU 208

CPU 208 receives a packet either from parser 202, engine 206 or possibly from a management CPU. For packets arriving from parser 202, if a clear packet is received at CPU 208 a policy index provided by the parser 202 is read and the associated policy is obtained, for example, from a Security Policy Database (SPD). The policy is checked to determine whether the packet should have been encrypted and if it was supposed to be encrypted but was not, then the packet is dropped or passed on for further processing. Otherwise, the packet is passed on toward its destination.

If the packet is an IPsec packet and a matching SA is found in SAD 204 using the SPI, and the encryption/authentication algorithm is not supported by engine 206, the packet is queued with the SA index for a management CPU, where it is decrypted using software algorithms. The decrypted packet is then passed back to CPU 208 for further processing and transmission.

If the packet is received from the engine 206 or a management CPU, it is already decrypted. The decrypted packet, the status, and the associated SA index are read from the source of the packet, that is, the engine 206 or management CPU. If the decryption status indicates an error, the packet is dropped and the error is logged. The SA index is used to obtain the SA data structure from the SAD 204.

Generally, the outer IP header and the IPsec header are stripped from the packet. However, if the packet is an IPsec transport mode packet, only the IPsec header is stripped and the IP header is maintained. The protocol field in the IPsec header of the next packet is checked and if it is AH or ESP, then the packet may belong to a nested tunnel. Therefore, the SPI and destination address are extracted from the IPsec header of the next packet and the SPI value is used to index into the SAD 204 to obtain the new SA data structure. The destination IP address is checked to determine whether it matches the destination IP address in the indexed SA. If either the SA is not defined or the destination IP address does not match, the packet is dropped and an error is logged. The foregoing series of checks is repeated for every level of IPsec nesting until either another protocol (non-AH, non-ESP) is encountered, or a transit IPsec header is encountered. If a matching SA is found, the SA is added to the list of SAs and/or list of transforms applied to the packet and the packet is passed along with the new SA parameters to the CPU 208 or a management CPU, depending on the decryption algorithm specified in the SA. The relevant CPU uses the list of SAs and/or transforms as a check after processing the innermost IPsec encapsulation, to determine whether the series of transforms applied was appropriate and in accordance with the relevant SA.

Otherwise, if it is not a nested tunnel scenario, IPsec selectors are extracted from the inner IP header (not the outer header, if tunneled) and these values are matched against selectors in the SA. For each of the selectors, the SA entry in the SAD must contain the value or values which were negotiated at the time the SA was created. For the packet receiver, as with inbound packets, the selector values in an inbound packet are checked for a match with those for the SA, to verify that the selector values are appropriate for the particular packet. If there is a mismatch, the packet is dropped and the event is logged. If the selectors match and the order of SAs applied to the packet is correct, the packet is passed toward its destination. Otherwise, the packet is dropped and the error is logged.

For a packet sender, the selector values are used similarly to determine whether a given SA is appropriate for use with a packet transmitted to the receiver.

Process for Generating an Index to Security Associations

Figure 4:
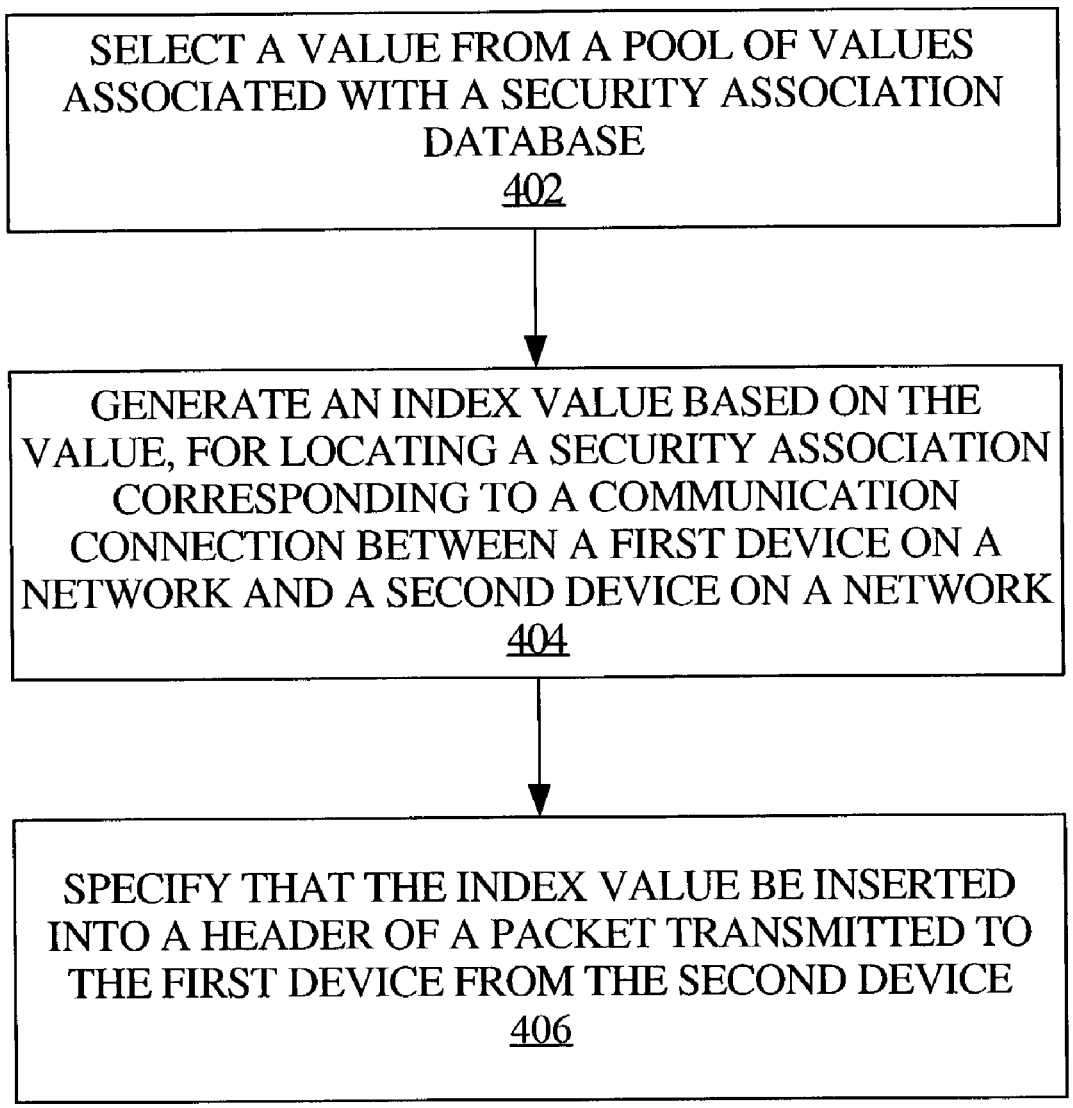
FIG. 4 is a flow diagram that illustrates a process for generating an index to security associations.

FIG. 4 is a flow diagram that illustrates a process for generating an index to security associations. The security associations (SA) are typically resident in a database such as Security Association Database 204 (FIG. 2). Further, the indexing of SAs in a SAD is typically performed by the receiver of packets that are secured by the policies and protocols negotiated between two or more nodes, device or hosts on a network and specified or identified in packet header information. Therefore, the process of FIG. 4 is performed by a receiver of such packets.

At block 402, a value is selected from a pool of available values that are associated with an SAD that stores SAs. For example, the pool of available values is basically a pool of currently unused indexes into the SAD. Block 402 is typically performed substantially concurrent with, that is, as part of the process of, negotiation of a secure communication between a first device and one or more other second devices. For example, the secure communication being negotiated between the devices may be an IPsec-based communication connection or session.

At block 404, an index value is generated based on the value selected at block 402. The index value generated at block 404 is for locating a first SA that corresponds to the first communication connection. The index value may simply be the value selected at block 402. Furthermore, the index value may be generated from the value selected at block 402, for example, as a direct index into the SAD. Alternatively, other more complex mechanisms may be used to generate an index value by further processing of the value selected from the pool at block 402.

At block 406, it is specified that the index value should be inserted into a header of a packet transmitted to the first device from the second device. In other words, the device that generates the index value, which in this scenario is the first device, transforms the index into an SPI value such that index=f(SPI). Further, after generating the SPI, it is then communicated to the transmitting device, which in this scenario is the second device, via the control plane (e.g. IKE). Therefore, when the transmitting or second device transmits IPsec packets to the receiving or first device under this session, it uses the specified SPI in the header of each IPsec packet. Hence, a packet receiver is able to generate an index for locating and/or accessing SAs which were negotiated between the receiver and one or more packet senders and which are stored or represented in a SAD, and to specify that packets sent to it from the senders with which SAs have been negotiated are to carry the appropriate index value to the associated SA in the SPI field of the IPsec header of data packets sent to the first device.

Process for Generating Header Information for a Data Packet

Figure 5:
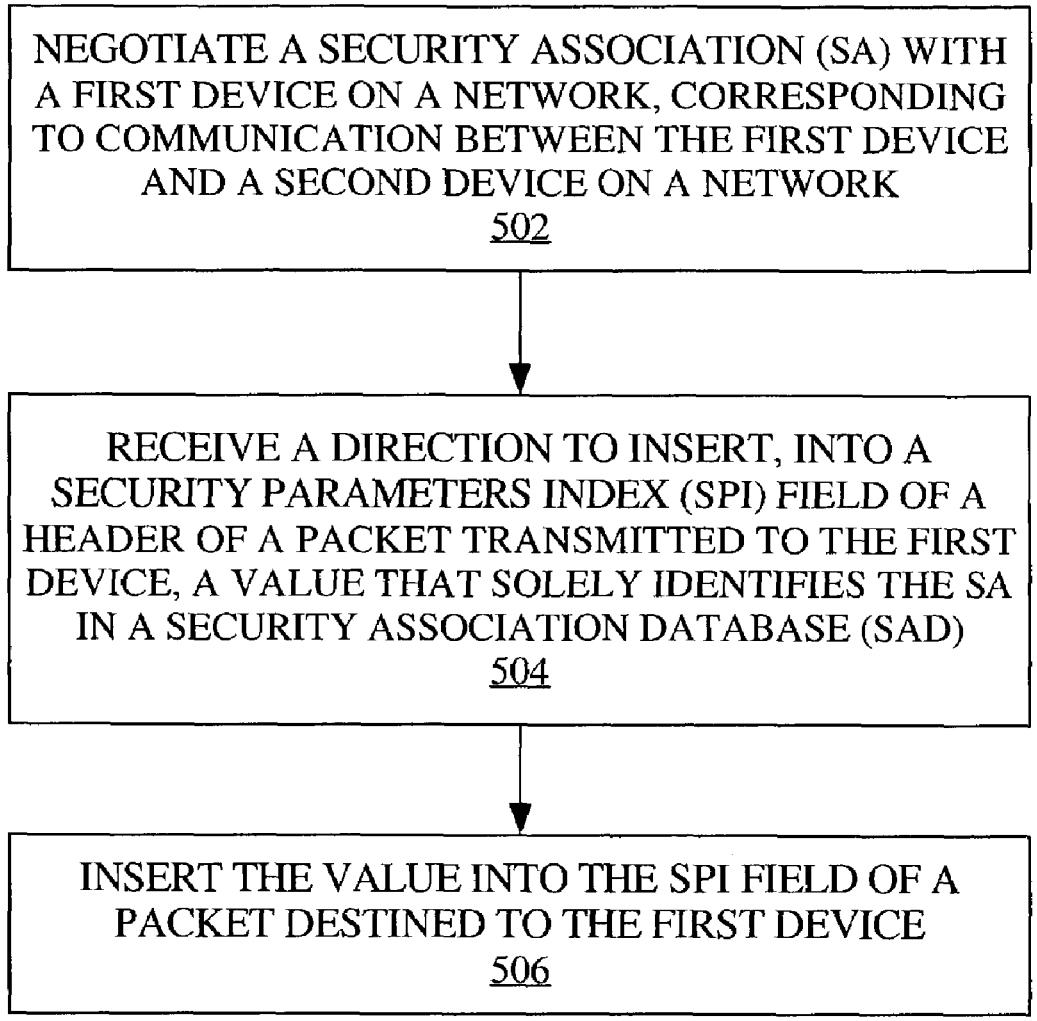
FIG. 5 is a flow diagram that illustrates a process for generating header information for a data packet.

FIG. 5 is a flow diagram that illustrates a process for generating header information for a data packet. Since the indexing of SAs in a SAD is typically performed by the receiver of packets that are secured by the policies and protocols negotiated between two or more nodes, devices or hosts on a network and specified or identified in packet header information, the process of FIG. 5 is typically performed by a sender, or transmitting device, of such packets.

At block 502, a security association (SA) is negotiated with a first, or receiving, device or node on a network. The SA corresponds to communication between the first device and at least one other device on a network. Block 502 is performed, manually or automated, according to conventional techniques and protocols such as the IPsec protocol. Block 502 is performed on a per-session basis rather than a per-packet basis.

At block 504, a direction is received from the receiving device, which in this scenario is the first device, which specifies to insert a specific value into a Security Parameter Index (SPI) field of a header associated with a packet that is transmitted to the first device. The directed value solely identifies the security association negotiated at block 502 and stored at the first device. The value that the second device, which in this scenario is the transmitting device, receives from the first or receiving device is stored in the SAD on the second device. When an egress packet is to be sent to the first device, the second device fetches the SPI value from its SA and uses it.

At block 506, the value is inserted into the SPI field of a packet destined for the first device. Thus, upon reception of the packet at the first device, the process described in reference to FIG. 3 can be performed by the first device or at a node associated with the first device.

Implementation Mechanisms

Hardware Overview

Figure 6:
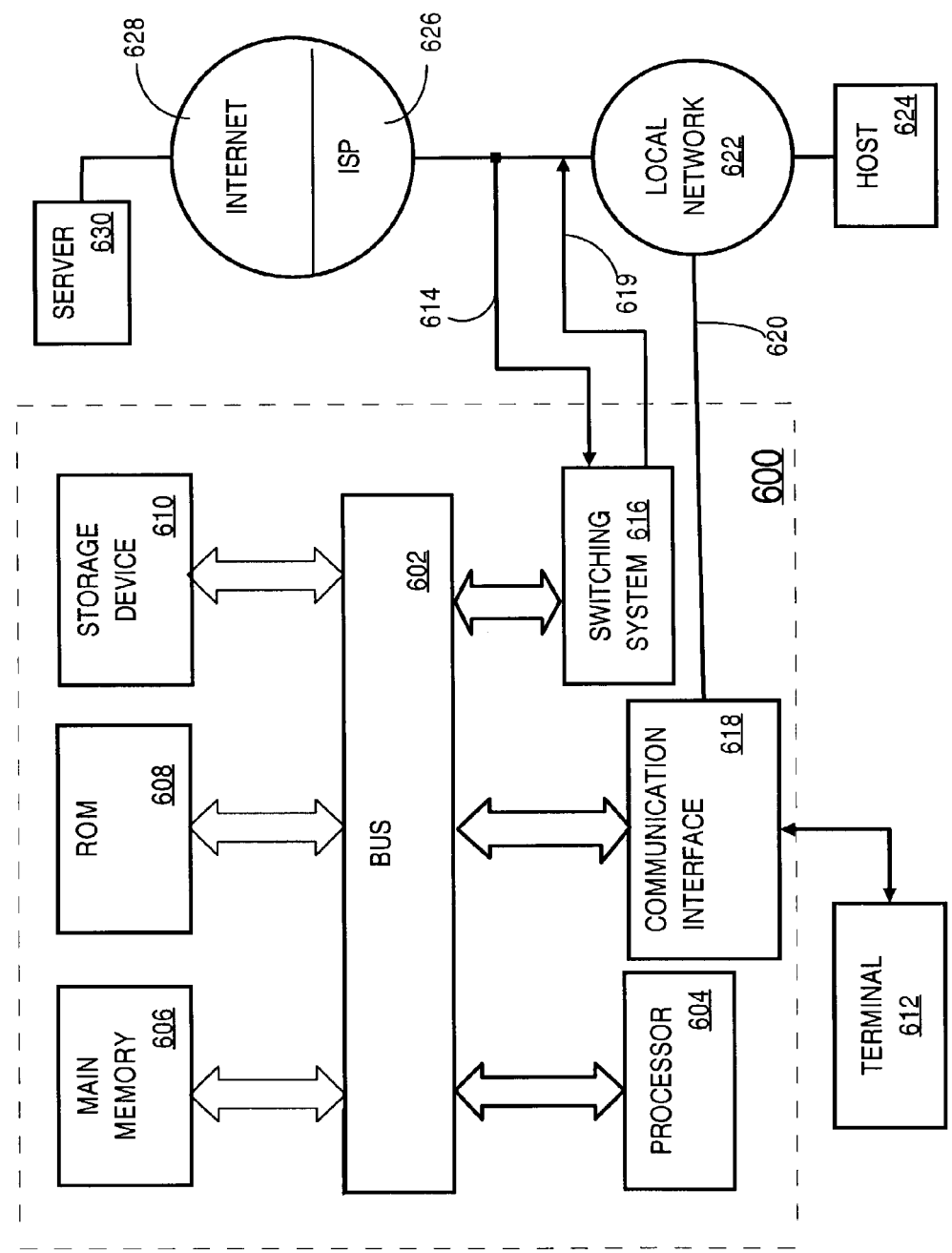
FIG. 6 is a block diagram that illustrates a computer system upon which an embodiment may be implemented.

FIG. 6 is a block diagram that illustrates a computer system 600 upon which an embodiment of the invention may be implemented. The preferred embodiment is implemented using one or more computer programs running on a network element. One example of such a network element is a router device, but the embodiments are not so limited.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for the techniques and functions described herein in a network system. According to one embodiment of the invention, such techniques and functions are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for the techniques and functions that are described herein.

The received code may be executed by processor 604 as it is received, and/or stored in storage device 610, or other non-volatile storage for later execution. In this manner, computer system 600 may obtain application code in the form of a carrier wave.

EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for locating a security association in an inbound Security Association Database (SAD), the method comprising the computer-implemented steps of:
   receiving a packet;
   wherein the packet comprises a Security Parameter Index (SPI) field comprising a concatenation of a verification value and an index value that is not based on a destination address or protocol value of the packet, wherein the index value uniquely identifies an entry in the inbound SAD;
   wherein the packet is received at an Internet Protocol Security (IPsec) accelerator that is configured to support one or more of transmission, reception, passing or switching of secure data packets in a packet switched network between the network and one or more end devices thereof or within a local area network (LAN) infrastructure, wherein the IPsec accelerator comprises an interface between the network and one or more of a private network or a LAN at which one or more of secure data packets or tunnels of the network terminate and wherein the IPsec accelerator is communicatively coupled with a switching device of the network;
   parsing the packet to identify a Security Parameter Index (SPI);
   determining, based only on the SPI, the index value that uniquely identifies an entry in the inbound SAD;
   identifying a security association in the entry of the inbound SAD based only on the index value and not based on a destination address or protocol value of the packet; and
   decrypting a payload associated with the packet based on information from the identified security association.

2. The method of claim 1, further comprising the computer-implemented steps of:
   comparing a destination address specified in the packet to a destination address associated with the identified security association;
   comparing a security protocol identifier specified in the packet to a protocol identifier associated with the identified security association; and
   if both the destination address and the security protocol identifier specified in the packet match the destination address and security protocol identifier associated with the identified security association, then decrypting a payload associated with the packet based on information from the identified security association.

3. The method of claim 1, wherein the step of receiving a packet includes receiving an IPsec packet.

4. The method of claim 1, wherein the step of determining comprises identifying the index value in a first portion of the SPI comprising less than all bits of the SPI.

5. The method of claim 1, further comprising steps of:
   determining, from the entry, a first verification value associated with the security association;
   determining, from the SPI, a second verification value associated with the index value; and
   verifying the identified security association by determining that the first verification value matches the second verification value.

6. The method of claim 1, further comprising the step of:
   verifying the identified security association based on a destination network address and a protocol identifier identified in the packet.

7. A computer-readable storage medium storing one or more sequences of instructions for locating a security association in an inbound Security Association Database (SAD), which instructions, when executed by one or more processors, cause the one or more processors to carry out the steps of:
   receiving a packet;
   wherein the packet comprises a Security Parameter Index (SPI) field comprising a concatenation of a verification value and an index value that is not based on a destination address or protocol value of the packet, wherein the index value uniquely identifies an entry in the inbound SAD;
   wherein the packet is received at an Internet Protocol Security (IPsec) accelerator that is configured to support one or more of transmission, reception, passing or switching of secure data packets in a packet switched network between the network and one or more end devices thereof or within a local area network (LAN) infrastructure, wherein the IPsec accelerator comprises an interface between the network and one or more of a private network or a LAN at which one or more of secure data packets or tunnels of the network terminate and wherein the IPsec accelerator is communicatively coupled with a switching device of the network;
   parsing the packet to identify a Security Parameter Index (SPI);
   determining, based only on the SPI, the index value that uniquely identifies an entry in the inbound SAD;
   identifying a security association in the entry of the inbound SAD based only on the index value and not based on the destination address or protocol value of the packet; and
   decrypting a payload associated with the packet based on information from the identified security association.

8. The computer-readable storage medium of claim 7, wherein the one or more sequences of instructions further comprise instructions, which when executed by the one or more processors, cause the one or more processors to carry out the steps of:
   comparing a destination address specified in the packet to a destination address associated with the identified security association;
   comparing a security protocol identifier specified in the packet to a protocol identifier associated with the identified security association; and
   if both the destination address and the security protocol identifier specified in the packet match the destination address and security protocol identifier associated with the identified security association, then decrypting a payload associated with the packet based on information from the identified security association.

9. The computer-readable storage medium of claim 7, wherein the one or more sequences of instructions cause the one or more processors to carry out the step of receiving by receiving an IPsec packet.

10. The computer-readable storage medium of claim 7, wherein the one or more sequences of instructions cause the one or more processors to carry out the step of determining by identifying the index value in a first portion of the SPI comprising less than all bits of the SPI.

11. The computer-readable storage medium of claim 7, wherein the one or more sequences of instructions further comprise instructions, which when executed by the one or more processors, cause the one or more processors to carry out the steps of:
determining, from the entry, a first verification value associated with the security association;
determining, from the SPI, a second verification value associated with the index value; and
verifying the identified security association by determining that the first verification value matches the second verification value.

12. The computer-readable storage medium of claim 7, wherein the one or more sequences of instructions further comprise instructions, which when executed by the one or more processors, cause the one or more processors to carry out the steps of:
verifying the identified security association based on a destination network address and a protocol identifier identified in the packet.

13. An apparatus for locating a security association in an inbound Security Association Database (SAD), comprising:
means for receiving a packet;
wherein the packet comprises a Security Parameter Index (SPI) field comprising a concatenation of a verification value and an index value that is not based on a destination address or protocol value of the packet, wherein the index value uniquely identifies an entry in the inbound SAD;
wherein the receiving means comprise an Internet Protocol Security (IPsec) accelerator that is configured to support one or more of transmission, reception, passing or switching of secure data packets in a packet switched network between the network and one or more end devices thereof or within a local area network (LAN) infrastructure, wherein the IPsec accelerator comprises an interface between the network and one or more of a private network or a LAN at which one or more of secure data packets or tunnels of the network terminate and wherein the IPsec accelerator is communicatively coupled with a switching device of the network;
means for parsing the packet to identify a Security Parameter Index (SPI);
means for determining, based only on the SPI, the index value that uniquely identifies an entry in the inbound SAD;
means for identifying a security association in the entry of the inbound SAD based only on the index value and not based on the destination address or protocol value of the packet;
decrypting a payload associated with the packet based on information from the identified security association.

14. The apparatus as recited in claim 13, wherein the determining means comprise means for identifying the index value in a first portion of the SPI comprising less than all bits of the SPI.

15. The apparatus as recited in claim 13, wherein the determining means comprise means for identifying a 17-bit value embedded in the SPI.

16. The apparatus as recited in claim 13, further comprising:
means for determining, from the entry, a first verification value associated with the security association;
means for determining, from the SPI, a second verification value associated with the index value; and
means for verifying the identified security association by determining that the first verification value matches the second verification value.

17. The apparatus as recited in claim 13, further comprising:
means for verifying the identified security association based on a destination network address and a protocol identifier identified in the packet.

18. The apparatus as recited in claim 13 wherein the receiving means comprise means for receiving an IPsec packet.

* * * * *

UNITED STATES PATENT AND TRADEMARK OFFICE
CERTIFICATE OF CORRECTION

PATENT NO. : 7,434,045 B1
APPLICATION NO. : 10/420568
DATED : October 7, 2008
INVENTOR(S) : Thomas Enderwick et al.

Page 1 of 1

It is certified that error appears in the above-identified patent and that said Letters Patent is hereby corrected as shown below:

Claim 13: Column 16, line 13 should read: packet; and

Signed and Sealed this

Thirty-first Day of March, 2009

JOHN DOLL
*Acting Director of the United States Patent and Trademark Office*